(12) United States Patent
Zhang et al.

(10) Patent No.: US 7,697,568 B1
(45) Date of Patent: Apr. 13, 2010

(54) METHOD AND SYSTEM FOR AUTOMATIC MODEM BANDWIDTH DETECTION IN A ROUTER

(75) Inventors: Yulin Zhang, San Jose, CA (US); Dany Ah Sue, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1930 days.

(21) Appl. No.: 10/378,760

(22) Filed: Mar. 3, 2003

(51) Int. Cl.
H04J 3/16 (2006.01)
(52) U.S. Cl. ........................ 370/468; 370/495
(58) Field of Classification Search ......... 370/229–236, 370/468, 495; 709/219, 230, 232–234, 238; 713/100; 375/255
See application file for complete search history.

(56) References Cited

U.S. PATENT DOCUMENTS

| | | | | |
|---|---|---|---|---|
| 5,048,054 A | * | 9/1991 | Eyuboglu et al. | 375/222 |
| 5,528,591 A | * | 6/1996 | Lauer | 370/231 |
| 5,867,483 A | * | 2/1999 | Ennis et al. | 370/252 |
| 5,886,643 A | * | 3/1999 | Diebboll et al. | 709/224 |
| 5,903,558 A | * | 5/1999 | Jones et al. | 370/351 |
| 6,058,102 A | * | 5/2000 | Drysdale et al. | 370/252 |
| 6,075,769 A | * | 6/2000 | Ghanwani et al. | 370/229 |
| 6,215,772 B1 | * | 4/2001 | Verma | 370/236 |
| 6,314,516 B1 | * | 11/2001 | Cagle et al. | 713/1 |
| 6,363,056 B1 | * | 3/2002 | Beigi et al. | 370/252 |
| 6,366,563 B1 | * | 4/2002 | Weldon et al. | 370/252 |
| 6,400,686 B1 | * | 6/2002 | Ghanwani et al. | 370/232 |
| 6,456,651 B1 | * | 9/2002 | Pilozzi et al. | 375/222 |
| 6,498,783 B1 | * | 12/2002 | Lin | 370/252 |
| 6,748,435 B1 | * | 6/2004 | Wang et al. | 709/225 |
| 6,912,200 B2 | * | 6/2005 | Halme | 370/238 |
| 7,180,858 B1 | * | 2/2007 | Roy et al. | 370/232 |
| 7,403,477 B2 | * | 7/2008 | Takeuchi et al. | 370/230 |
| 2002/0083233 A1 | * | 6/2002 | Owen et al. | 710/60 |
| 2002/0152303 A1 | * | 10/2002 | Dispensa | 709/224 |
| 2003/0189977 A1 | * | 10/2003 | Sweitzer et al. | 375/222 |
| 2003/0198235 A1 | * | 10/2003 | Weldon et al. | 370/401 |
| 2004/0044789 A1 | * | 3/2004 | Angel et al. | 709/238 |
| 2004/0062582 A1 | * | 4/2004 | Dobbertin et al. | 399/394 |
| 2007/0005804 A1 | * | 1/2007 | Rideout | 709/246 |
| 2008/0034414 A1 | * | 2/2008 | Mao et al. | 726/13 |

OTHER PUBLICATIONS

U.S. Appl. No. 60/363,236, filed Mar. 2002, Angel.*

* cited by examiner

*Primary Examiner*—Ricky Ngo
*Assistant Examiner*—Phuongchau B Nguyen
(74) *Attorney, Agent, or Firm*—Stolowitz Ford Cowger LLP

(57) ABSTRACT

A method and system for automatic modem bandwidth detection. The method includes the step of transmitting a plurality of probe packets from a router to an aggregator via a modem. A plurality of reply packets are the detected wherein the reply packets are transmitted from the aggregator to the router via the modem in response to the probe packets. An upstream data transmission rate of the modem is then determined based on a relative rate of transmission of the probe packets transmitted by the router to the reply packets received by the router.

16 Claims, 4 Drawing Sheets

METHOD AND SYSTEM FOR AUTOMATIC MODEM BANDWIDTH DETECTION IN A ROUTER

TECHNICAL FIELD

This invention relates to the field of computer system networking. More particularly, the present invention relates to an improved, easy to implement, router-to-modem interface suited for use for residential or commercial network access.

BACKGROUND ART

The widespread deployment of large, interconnected computer system networks has transformed the nature of communication. The largest such network, the Internet, is a general purpose, public computer network which allows millions of computers all over the world, connected to the Internet, to communicate and exchange digital data with other computers also coupled to the Internet. As new technologies emerge, the speed at which one can connect onto the Internet is ever increasing. Now, users on the Internet have the bandwidth to participate in live discussions in chat rooms, play games in real-time, watch streaming video, listen to music, shop and trade on-line, etc. In the future, it is imagined that the bandwidth will be such that video-on-demand, HDTV, IP telephony, video teleconferencing, and other types of bandwidth intensive applications will soon be possible.

One method of increasing the speed of a network connection involves the use of a "broadband" connection. Broadband refers to the characteristic that a connection has much greater access bandwidth than a traditional telephone modem (e.g., 28.8 kbps, 56 kbps, etc.). The most commonly implemented broadband connections are generally cable modem and DSL modem connections.

Modems are electronic devices used to connect computer systems to a wide area network connection, generally, a twisted pair telephone line (e.g., a DSL modem) or coaxial cable television line (e.g., a cable modem). With respect to cable modems, cable modems are used to connect a computer to a cable TV service that provides Internet access. Cable modems dramatically increase the bandwidth between the user's computer and the Internet service provider, taking advantage of the increased communications bandwidth capabilities of the cable television line. With respect to DSL modems, DSL modems are used to connect a computer to a twisted pair telephone line (e.g., digital subscriber line). DSL technology dramatically increases the digital capacity of ordinary telephone lines (the local loops) into the home or office.

Routers are typically used in conjunction with the modems and the broadband connections. The router is connected to the modem (e.g., cable modem or DSL modem) and is used to share the broadband connection among multiple computer systems or devices. Generally, the computer systems access the broadband connection via the router. Traffic destined for the wide area network (e.g., the Internet) is transmitted from the router to the modem and then on to the wide area network. The router also provides additional services to users, such as, for example, firewall protection, QoS (quality of service) support, VPN (virtual private network) supported network access, IP (Internet protocol) phone support, and the like.

There exists a problem, however, with the connection speed of the router and the devices of the local area network with respect to the connection speed of the modem to the wide area network. The modem for the broadband connection typically couples to the router via an Ethernet connection. The bandwidth of the Ethernet connection (e.g., WAN port) of the router is 10/100 Mbps, which is much higher than the maximum upstream speed of most types of broadband access modems currently available. If traffic is forwarded to the modem from the router at Ethernet speeds, packets could be indiscriminately discarded at the modem and significantly impair applications that are dependent on latency and data throughput (e.g., voice over IP applications, etc.).

One prior art solution to this problem involves the use of two important QoS techniques. Traffic shaping is used to control the output of the router to the modem and to the broadband connection by matching the data output speed of the router to the speed of attached modem. LLQ (low latency queuing) is used to make sure important high priority packets (e.g., voice packets) will get the highest bandwidth priority and won't be dropped even when the output stream exceeds the target traffic shaping threshold. As known by those skilled in the art, the target speed of traffic shaping should be the physical upstream speed after modem gets trained. Most of the time, this speed will be less than the maximum modem speed (e.g., approximately 800 kbps with ADSL modems and 2 Mbps with cable modems) due to cable or DSL line transmission conditions (e.g., distance, interference, etc.).

Prior art traffic shaping and LLQ techniques are not sufficient due to fact that there is no way for the router to know the exact trained speed of the modem since there is no such information exchange between the router and the modem. In order for traffic shaping to work correctly, the user has to find out the trained speed for the modem (e.g. by calling the service provider) and then manually configure the trained speed on the router (e.g., through a configuration utility, etc.).

Thus, what is required is a solution for configuring a router to function with a coupled modem in view of the upstream speed of a broadband connection. The required solution should not require manual intervention of the user in order to function properly. The required solution should function correctly in different configuration environments and with different types of modems. The present invention provides a novel solution to these requirements.

DISCLOSURE OF THE INVENTION

Embodiments of the present invention provide a method and system for configuring a router to function with a coupled modem in view of the upstream speed of a broadband connection. Embodiments of the present invention do not require manual intervention of the user in order to function properly. Additionally, embodiments of the present invention function correctly in different configuration environments and with different types of modems.

In one embodiment, the present invention is implemented as a method for automatic modem bandwidth detection process. The method is implemented using the functionality of a router. The method includes the step of transmitting a plurality of probe packets from the router to an aggregator via a modem. A plurality of reply packets are the detected wherein the reply packets are transmitted from the aggregator to the router via the modem in response to the probe packets. An upstream data transmission rate of the modem is then determined based on a relative rate of transmission of the probe packets transmitted by the router to the reply packets received by the router.

In one embodiment, the router is further configured to determine whether the modem connected to the router is a cable modem or a DSL modem. This determination can be made by detecting whether PPPoE (point to point protocol over Ethernet) is used, where PPPoE is associated with DSL modem implementations.

In another embodiment, the router is further configured to determine an overhead for transmitting packets from the router to the aggregator via the modem. The overhead is then accounted for in the determination of the upstream data transmission rate of the modem.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Embodiments of the present invention provide a method and system for configuring a router to function with a coupled modem in view of the upstream speed of a broadband connection. Embodiments of the present invention do not require manual intervention of the user in order to function properly. Additionally, embodiments of the present invention function correctly in different configuration environments and with different types of modems. The present invention and its benefits are further described below.

Figure 1:
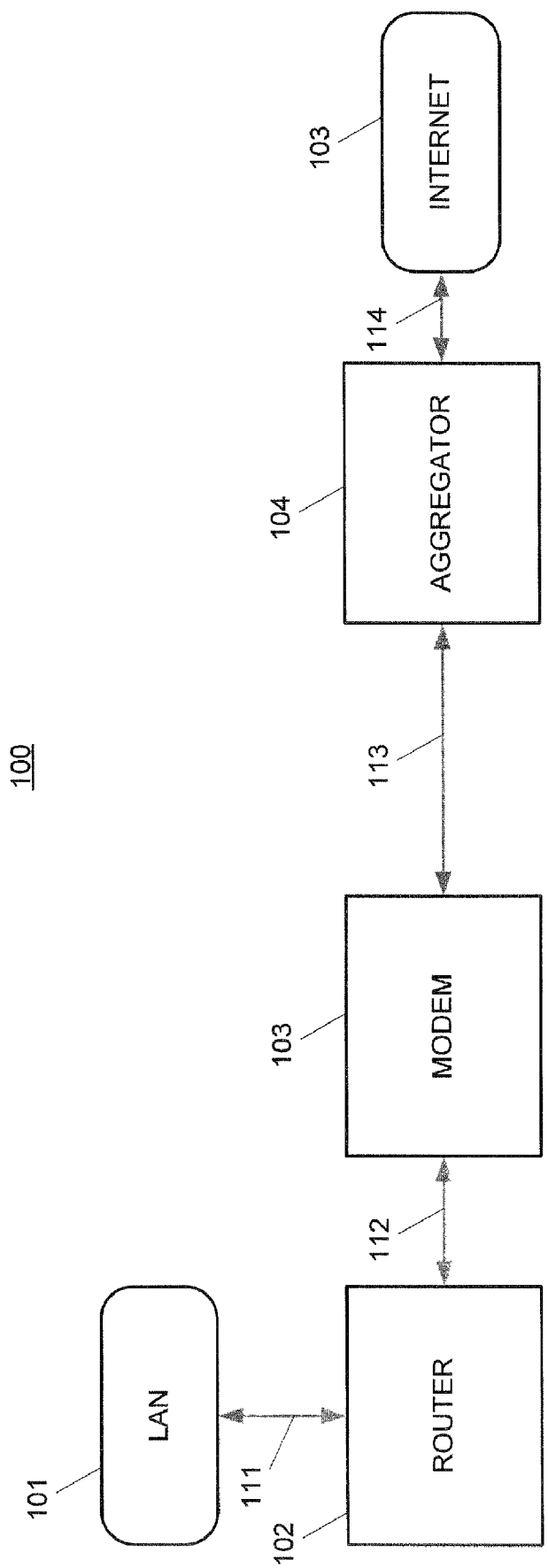
FIG. 1 shows a network system in accordance with one embodiment of the present invention.

FIG. 1 shows a system 100 in accordance with one embodiment of the present invention. As depicted in FIG. 1, system 100 shows a LAN 101 (local area network) coupled to a router 102 via a connection 111 to a port of the router 102. The router 102 is coupled to a modem 103 via a connection 112 as shown. A connection 113 connects the modem 103 to an aggregator 104, and subsequently, via connection 114, to the Internet 105.

Generally, the LAN 101 comprises a distributed computer network for implementing digital communications between a variety of different computer systems (e.g., desktop computer systems, printers, etc.). The LAN 101 is typically an Ethernet based network (e.g., Intranet, Extranet, etc.). Accordingly, communication between devices comprising the LAN 101 occurs at typical Ethernet speeds (e.g., 10 Mbps or 100 Mbps Ethernet). Connection 111 to the router 102 is typically an Ethernet connection (e.g., 10/100 Mbps) to a "LAN port" of the router 102, and also operates at typical Ethernet speeds.

In this embodiment, the modem 103 functions by implementing a broadband connection 113 to the aggregator 104 and the Internet 105. In the system 100 embodiment, the router 102 functions by routing packets from the LAN 101 onto the Internet 105. To reach the Internet 105, the packets are transmitted from the router 102 to the modem 103 via a connection 112. The modem 103 then modulates the data comprising the packets onto the connection 113, thereby transmitting them to the aggregator 104. The aggregator 104 is typically at the head-end or central office of a cable TV company or a telephone company. The aggregator 104 functions by receiving a plurality of connections from a plurality of different modems (e.g., one such modem 103 is shown) and concentrating them onto a connection 114 to the Internet 105.

Referring still to the system 100 embodiment, as known by those skilled in the art, the bandwidth of connection 112 between the router 102 and the modem 103 is typically a 10/100 Mbps Ethernet connection. Accordingly, the connection 112 has a much higher data transfer bandwidth than the maximum upstream speed of any of the currently available technologies (e.g., cable modem over cable TV coaxial cable, any of the various forms of DSL technology, etc.) for implementing the broadband connection 113. If data packets are forwarded from the router 102 to the modem 103 without taking into account the speed difference (e.g., without traffic shaping), data packets could be indiscriminately discarded at the modem 103 and applications that depend upon low latency and high data throughput will suffer. For example, in a voice over IP application, voice quality will deteriorate as the data packets comprising the voice information are dropped indiscriminately.

Thus, the transmission speed from the router 102 to the modem 103 needs to match the upstream data transfer rate of the modem 103 across the connection 113. Embodiments of the present invention automatically determine the upstream data transfer rate of the modem 103, thereby allowing the matching of the data transfer rate from the router 102 to the modem 103 in accordance with the upstream data transfer rate of the connection 113.

Figure 2:
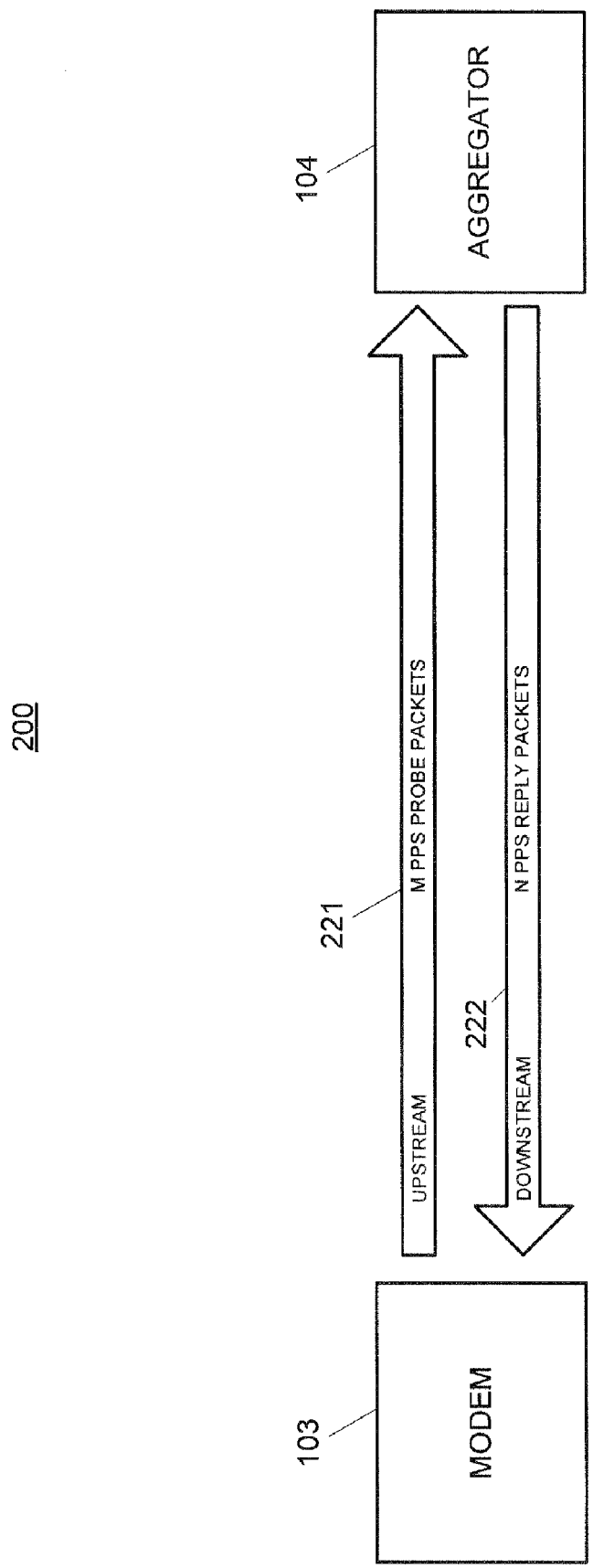
FIG. 2 shows a diagram of a network system in accordance with one embodiment of the present invention with respect to an upstream communications path and a downstream communications path.

FIG. 2 shows a diagram of a system 200 with respect to an upstream data transfer path 221 and a downstream communications path 222. Although shown separately in FIG. 2 for purposes of clarity, it should be noted that the upstream path 221 and a downstream path 222 are both implemented within the same connection (e.g. connection 113 shown in FIG. 1).

The system 200 embodiment graphically depicts the upstream data transfer bandwidth detection process in accordance with one embodiment of the present invention. In one embodiment, the method is implemented using the functionality of a router (e.g., the internal embedded processor of the router executing software code that implements the functionality of the present invention). The method includes the step of transmitting a plurality of probe packets at "m" pps (packets per second) rate upstream from the router 102 to the modem 103 and through the upstream communications path 221 to the aggregator 104. Once the probe packets are received by the aggregator 104, the aggregator 104 transmits a plurality of reply packets back at "n" pps through the downstream communications path 222 to the modem 103 and to the router 102 where they are detected.

The router then determines an upstream data transmission rate of the modem, and thus, the trained upstream data transmission rate of the connection, based on a relative rate of transmission of the m pps probe packets transmitted by the router 102 to the n pps reply packets received by the router 102.

Referring still to the system 200 embodiment of FIG. 2, an automatic upstream data transfer discovery algorithm is implemented by the router 102. In the present embodiment, the algorithm uses the following two assumptions: first, the modem upstream data transfer speed must be less than or equal to the downstream data transfer speed (e.g., as is currently true for most DSL and cable broadband connections); and second, the overhead for transmitting packets (e.g., IP packets) needs to be known.

The system 200 embodiment determines whether it is operating with a cable modem or a DSL modem by detecting whether PPPoE (point to point protocol over Ethernet) is used by the modem 104 or DHCP (Dynamic Host Configuration Protocol) is used. As is well known, PPPoE is used in xDSL installations and DHCP is used in cable modem installations. Once a PPPoE configuration or a DHCP configuration is up, the router 102 will get an assigned IP address from the ISP (Internet service provider) and the aggregator 104's IP address should be also exposed to the router 102.

In the system 200 embodiment, when modem bandwidth discovery process is started, the router 102 will send out probe packets (the actual packet type could either be ping packets or self-addressed IP packets) to the aggregator 104. The probe packets are transmitted at a certain rate, m pps, the packet size is p, the overhead for transmitting each packet is "o" (e.g., for ADSL packets include the headers of PPPoE and AAL5 frame), and the maximum possible upstream bandwidth is B.

In order to fully utilize B, we have the following formula to calculate m:

$$m*(p+o)*k*8 = B \quad (1)$$

(k=53/48 for ADSL, k=1 for a cable modem)

While m pps probe packets are being sent to the aggregator, the echo packet return rate is continually counted until it stabilizes at a constant value n pps. According to equation (1) above, the relationship between n and the modem trained speed T should be:

$$n*(p+o)*k*8 = T \quad (2)$$

Then equation (3) is defined by equations (1) and (2) as:

$$T = n*B/m \quad (3)$$

To be in accordance with deployment conventions, T should be rounded to a multiple of 64 k.

Once the modem trained speed T is determined (e.g., the upstream data transfer rate), intelligent traffic shaping can be performed by the router 102 to optimize high QoS applications such as VoIP, and the like. The algorithm of the present invention enables the router 102 to determine the exact modem trained speed without requiring any specialized configuration messages or information from the modem 103 or requiring any manually input configuration information from the user.

A router in accordance with one embodiment of the present invention can be provided with a standardized configuration that implements the bandwidth determination process described above. This standardized configuration would allow the router to function in a variety of different environments with a variety of different modems and broadband connections. With each case, the router would be able to automatically detect the upstream trained modem speed and optimally configure its traffic shaping functions.

Figure 3:
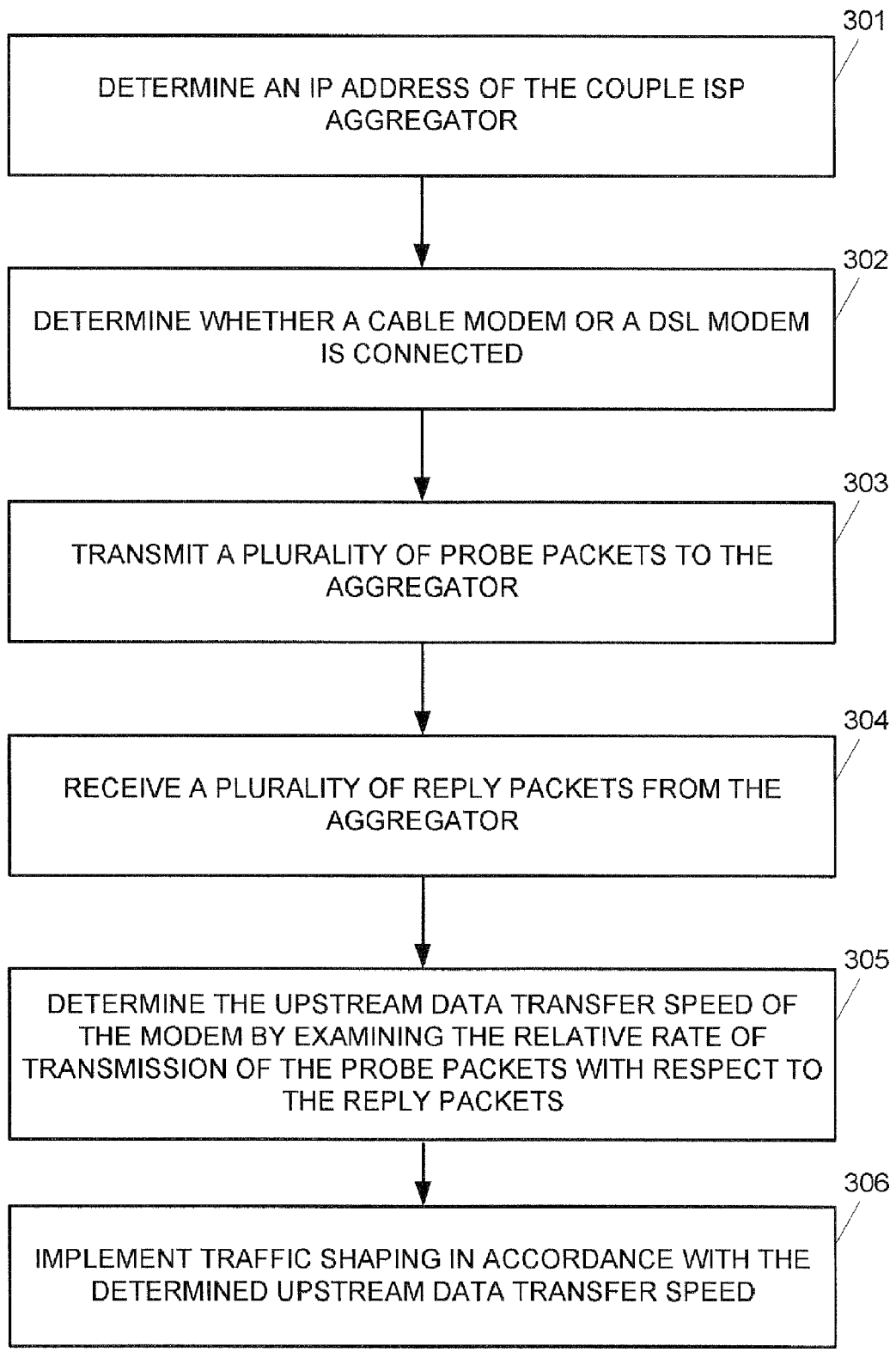
FIG. 3 shows a flowchart of an automatic modem bandwidth detection process in accordance with one embodiment of the present invention.

FIG. 3 shows a flowchart of a automatic modem bandwidth detection process 300 in accordance with one embodiment of the present invention. As depicted in FIG. 3, process 300 shows the operating steps of a router (e.g., router 102 of FIG. 2) as it automatically determines the upstream data transfer rate of a coupled modem (e.g., modem 103) operating with a broadband connection (e.g., connection 113).

Process 300 begins in step 301, where the router 102 determines the IP address of the ISP's aggregator. As described above, once a PPPoE or DHCP session is initiated, the IP address of the aggregator should be exposed and obtainable by the router. In step 302, the router 102 determines whether the modem is a DSL modem or a cable modem. If PPPoE is in use, then the modems is a DSL modem. Otherwise, if DHCP is configured, the modem should be a cable modem. In step 303, a plurality of probe packets are transmitted to the aggregator from the router at a measured rate. In step 304, a plurality of reply packets are received by the router from the aggregator. As described above, the reply packets are transmitted by the aggregator in response to the probe packets. The reply packets are received at a measured rate. In step 305, the router determines the upstream data transfer speed of the modem by comparing the transmission rate of the probe packets to the reception rate of the reply packets. As described above, this rate corresponds to the actual trained modem speed for the broadband connection.

Figure 4:
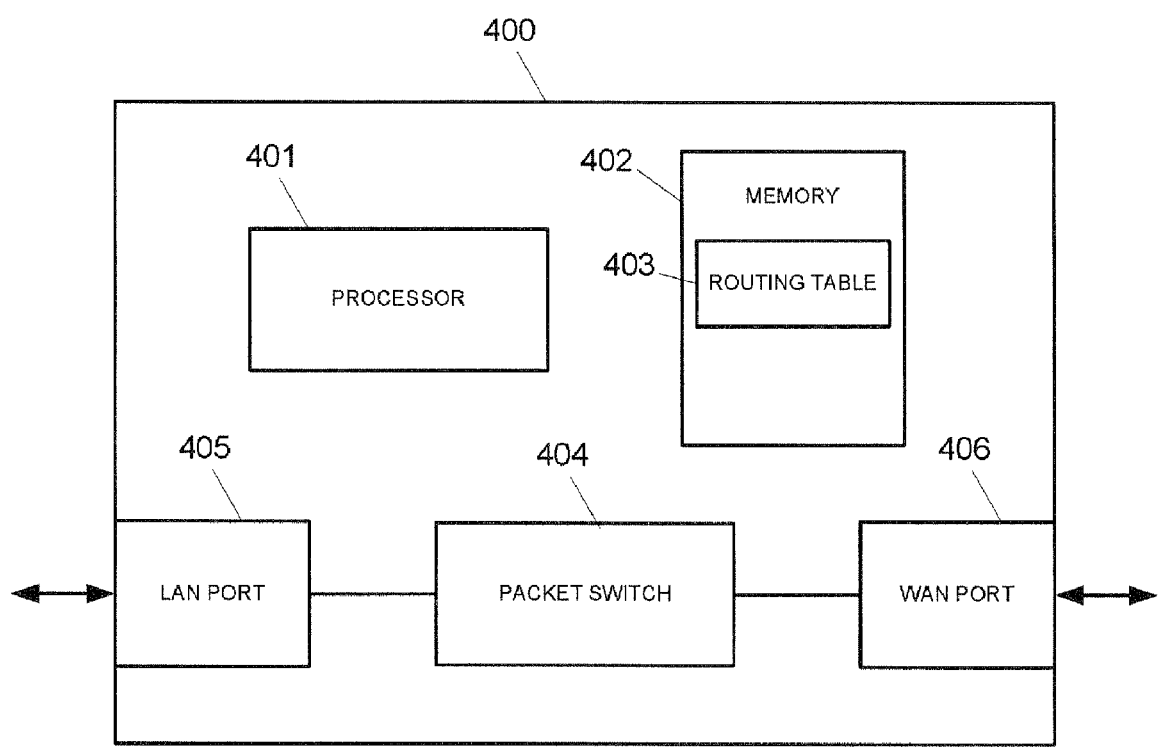
FIG. 4 shows a generalized block diagram of a router in accordance with one embodiment of the present invention.

Referring to FIG. 4, a generalized block diagram of a router 400 is illustrated. As described in the above discussions of the present invention, certain processes and steps are discussed that are realized, in one embodiment, as a series of instructions (e.g., a software program, software code, etc.) that reside within a computer readable memory of a router 400 and are executed by one or more processors 401 of the router 400. When executed, the instructions cause the router 400 to perform the specific functions and exhibit the specific behavior which was described in detail above.

Specific aspects of the present invention are operable within a programmed computer system which can function as IP network device, such as a home router, broadband router, or IP gateway, or other devices that can implement routing functionality, such as a desktop computer system or server computer system. A generalized example of such a router operable to implement the elements and functions of the present invention is shown in FIG. 4.

In general, the router 400 of the present invention includes one or more central processor(s) 401 for processing information and instructions, a computer readable memory unit 402 (e.g., random access memory, static RAM, dynamic RAM, etc.) for storing information and instructions for the central processor(s) 401 and for storing routing table(s) 403. The processor 401 executes software instructions stored in the memory 402 and controls the router 400 in accordance with the software instructions and implements the functionality described above. The router 400 includes a packet switch 404 for routing data packets from a LAN port 405 to a WAN port 406 in accordance with the addressing information within the packets.

Thus, embodiments of the present invention provide a method system for configuring a router to function with a coupled modem in view of the upstream speed of a broadband connection. Embodiments of the present invention do not require manual intervention of the user in order to function properly. Additionally, embodiments of the present invention function correctly in different configuration environments and with different types of modems.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the Claims appended hereto and their equivalents.

What is claimed is:

1. A method comprising:
    transmitting a plurality of probe packets from a router to a modem, wherein the probe packets are transmitted from the router with a first packet transmission rate, and wherein the modem is configured to transmit the probe packets to an aggregator at an upstream data transmission rate;
    detecting a plurality of reply packets transmitted from the aggregator to the router via the modem, wherein the reply packets are transmitted by the aggregator in response to the probe packets, and wherein the reply packets are received by the router from the modem at a second packet transmission rate;
    determining, with the router, the upstream data transmission rate of the modem based on the first packet transmission rate, the second packet transmission rate, and an overhead associated with the probe packets and the reply packets; and
    detecting whether a PPPoE protocol or DHCP is used in the overhead to determine whether the modem is a DSL modem or a cable modem, respectively.

2. The method of claim 1 further comprising:
    transmitting the plurality of probe packets from the router wherein the probe packets include ping packets.

3. The method of claim 1 further comprising:
    transmitting the plurality of probe packets from the router wherein the probe packets include self-addressed packets.

4. The method of claim 1 further comprising:
    configuring a traffic shaping function of the router in accordance with the determination of the upstream data transmission rate.

5. The method of claim 1 further comprising:
    implementing a standard configuration for the router by enabling the router to automatically determine upstream data transmission rates for a plurality of different types of broadband connections.

6. A system for automatic modem bandwidth detection comprising:
    a router configured to couple to a modem for communicating with a broadband connection, wherein the router is configured to automatically detect an upstream data transmission rate of the modem, wherein the router is configured to transmit a plurality of probe packets to the modem with a first packet rate, wherein the modem is configured to transmit the probe packets to an aggregator at an upstream data transmission rate, wherein the router is configured to detect a plurality of reply packets transmitted from the aggregator to the router in response to the probe packets, wherein the reply packets are received by the router from the modem at a second packet rate, and wherein the router is configured to determine the upstream data transmission rate based on the first packet rate of the router transmitting the probe packets and the second packet rate of the router receiving the reply packets, wherein the router is configured to detect whether a PPPoE protocol or DHCP is used in the overhead to determine whether the modem is a DSL modem or a cable modem, respectively.

7. The system of claim 6 wherein the plurality of probe packets transmitted from the router include ping packets.

8. The system of claim 6 wherein the plurality of probe packets transmitted from the router include self-addressed packets.

9. The system of claim 6 wherein the router is configured to implement a traffic shaping function in accordance with the determination of the upstream data transmission rate.

10. The system of claim 6 wherein the router is implemented in accordance with a standard configuration enabling the router to automatically determine upstream data transmission rates for a plurality of different types of broadband connections.

11. A router comprising:
    means for transmitting a plurality of probe packets from a router to a modem, wherein the probe packets are transmitted from the router with a first packet rate, and wherein the modem is configured to transmit the probe packets to an aggregator at an upstream data transmission rate;
    means for detecting a plurality of reply packets transmitted from the aggregator to the router via the modem, wherein the reply packets are transmitted by the aggregator in response to the probe packets, and wherein the reply packets are received by the router from the modem at a second packet rate;
    means for determining, in the router, the upstream data transmission rate of the modem based on the first packet rate of the router transmitting the probe packets and the second packet rate of the router receiving the reply packets; and
    means for detecting whether a PPPoE protocol or DHCP is used in the overhead to determine whether the modem is a DSL modem or a cable modem, respectively.

12. The router of claim 11 further comprising:
    means for implementing a standard configuration for the router by enabling the router to automatically determine upstream data transmission rates for a plurality of different types of broadband connections.

13. A computer readable media having computer readable code, which when executed by a computer, cause the computer to:
    transmit a plurality of probe packets from a router to a modem, wherein the probe packets are transmitted from the router with a first packet rate, and wherein the modem is configured to transmit the probe packets to an aggregator at an upstream data transmission rate;
    detect a plurality of reply packets transmitted from the aggregator to the router via the modem, wherein the reply packets are transmitted by the aggregator in response to the probe packets and wherein the reply packets are received by the router from the modem at a second packet rate;
    determine in the router, the upstream data transmission rate of the modem based on the first packet rate of the router transmitting the probe packets and the second packet rate of the router receiving the reply packets; and detect whether a PPPoE protocol or DHCP is used in the overhead to determine whether the modem is a DSL modem or a cable modem, respectively.

14. The computer readable media of claim 13 further comprising:

implementing a standard configuration for the router by enabling the router to automatically determine upstream data transmission rates for a plurality of different types of broadband connections.

15. The computer readable media of claim 14 wherein the standard configuration automatically determines the upstream data transmission rate without requiring manual intervention of the user.

16. The computer readable media of claim 15 wherein the standard configuration function automatically determines the upstream data transmission rate of a plurality of different types of modems.

* * * * *

UNITED STATES PATENT AND TRADEMARK OFFICE
CERTIFICATE OF CORRECTION

| | | |
|---|---|---|
| PATENT NO. | : 7,697,568 B1 | |
| APPLICATION NO. | : 10/378760 | |
| DATED | : April 13, 2010 | |
| INVENTOR(S) | : Zhang et al. | |

It is certified that error appears in the above-identified patent and that said Letters Patent is hereby corrected as shown below:

Column 8, line 61            In Claim 13, after "packets" insert -- , --.

Column 8, line 64            In Claim 13, after "determine" insert -- , --.

Signed and Sealed this
Thirty-first Day of May, 2011

David J. Kappos
*Director of the United States Patent and Trademark Office*